United States Patent [19]

Matsuyama et al.

[11] 4,341,445
[45] Jul. 27, 1982

[54] LIQUID CRYSTAL DISPLAY ELEMENT AND PRODUCTION THEREOF

[75] Inventors: Shigeru Matsuyama; Masaharu Koyama; Yukihiro Sato, all of Mobara, Japan

[73] Assignee: Hitachi, Ltd., Tokyo, Japan

[21] Appl. No.: 136,370

[22] Filed: Apr. 1, 1980

[30] Foreign Application Priority Data

May 18, 1979 [JP] Japan .................................. 54-60436

[51] Int. Cl.³ ............................................... G02F 1/13
[52] U.S. Cl. .................................................. 350/344
[58] Field of Search ............ 350/344, 340, 341, 339 R, 350/339 D, 339 F

[56] References Cited

U.S. PATENT DOCUMENTS 3,808,497  4/1974  Greeson, Jr. et al. .............. 350/344

Primary Examiner—Vincent P. McGraw
Attorney, Agent, or Firm—Craig and Antonelli

[57] ABSTRACT

A liquid crystal display element characterized by having an orientation controlling film containing a uniformly dispersed spacer therein on one inside surface of electrode substrates shows only a slight deviation in changes of the distance between the two electrode substrates even in the case of a large-size element. Such a liquid crystal display element can be produced by coating a mixture of a film forming material, a spacer and a solvent on one surface of an electrode adhered to one substrate, dried and baked, followed by conventional display element producing procedures.

9 Claims, 6 Drawing Figures

LIQUID CRYSTAL DISPLAY ELEMENT AND PRODUCTION THEREOF

This invention relates to a liquid crystal display element, particularly to a liquid crystal display element having a uniform distance between a pair of electrode substrates facing each other, and a process for producing the same.

In general, liquid crystal display elements which contain a liquid crystal material between a pair of electrodes facing each other perform a display by applying optical changes produced in the liquid crystal material when a voltage is applied to the electrodes mentioned above. Time response properties of the optical changes greatly depend on the distance between the electrodes facing each other. Usually, the distance between a pair of substrates which carry the above-mentioned electrodes facing each other is about 10 $\mu$m. When this distance is not maintained accurately, there arise deviations of response time of the liquid crystal material and display properties are greatly lowered. Therefore, it is necessary to use a spacer having remarkably high dimensional accuracy. As the spacers meeting such a requirement, there have been known fibrous spacers such as glass fibers, etc.

FIG. 1 is a schematic cross-sectional view of one example of conventional field-effect type liquid crystal display elements. In FIG. 1, to the inside surfaces of upper substrate 1 and lower substrate 2 made of transparent glass facing each other, an upper electrode 3 and a lower electrode 4 made of transparent electroconductive film in the form of, for example, a figure 8 comprising seven segments are adhered, liquid crystal orientation controlling films 5 and 6 made of transparent insulating silicon monooxide (SiO) are formed thereon, a sealant 7 containing a spacer 7a seals the periphery of the upper substrate 1 and the lower substrate 2 while maintaining the distance between the two substrates at several to several tens microns, and a nematic liquid crystal 8 is enclosed in a sealed space between the two substrates. The liquid crystal 8 shows so-called twisted orientation having optical rotation wherein the long axes of the liquid crystal molecules are parallel to individual interfaces of the upper substrate 1 and the lower substrate 2 and are at right angles by virture of a gradual twist with respect to each other. The outside surface of the upper substrate 1 is coated with an upper polarizing plate 9 having a polarizing axis corresponding to the orientation direction of the liquid crystal molecules at this interface. The outside surface of the lower substrate is also coated with a lower polarizing plate 10 having a polarizing axis corresponding to the orientation direction of the liquid crystal melecules at this interface and the outside surface of the lower polarizing plate 10 is coated with a reflective plate 11. In the liquid crystal display element constructed as mentioned above, incident light from the front side of the element is polarized by the upper polarizing plate 9, passed through the upper substrate 1 and rotated 90° in the liquid crystal 8, and thereafter it is passed through the lower substrate 2 and the lower polarizing plate 10 and reflected at the reflective plate 11 to the direction of the front side. When a voltage is applied to selected upper electrodes 3 and lower electrodes 4 at such a time, the liquid crystal at the portion where the voltage is applied loses optical rotation since the long axes of the liquid crystal molecules are oriented by changing the direction to the direction of the electric field. As a result, incident light polarized by the upper polarizing plate 9 is passed through such a liquid crystal portion as it is without rotated, but it is intercepted by the lower polarizing plate 10 which has a polarization axis different to it in 90° and reflected light disappears, so that such a portion becomes dark and the desired pattern is displayed.

As a means for maintaining the distance between the upper and lower substrates 1 and 2 constant in the liquid crystal display element having the construction as mentioned above, there is known a method for sealing the periphery of the upper and lower substrates 1 and 2 while maintaining the distance therebetween constant with a sealant 7 such as an epoxy series adhesive, a low melting point glass frit, or the like containing a glass fiber spacer 7a (as shown in FIG. 2) or a bead-like spacer having a uniform particle size 7b (as shown in FIG. 3). In these FIGS. 2 and 3, the lower substrate 2 is not shown. The method as mentioned above is remarkably effective in the case of small-size liquid crystal display elements. But in the case of large-size liquid crystal display elements, that is, in the case of large panel display areas (e.g. 50 mm × 50 mm or more), there takes place deflection at the central portion (the display portion) of the liquid crystal display element as shown in FIG. 4, which results in changing the distance between the upper and lower substrates 1 and 2 and failing to maintain high accuracy of dimension at the central portion of the liquid crystal display element. Particularly in the case of the upper and lower substrates 1 and 2 having a thickness of 1 mm or less, it is almost impossible to maintain the difference in distances at the periphery portion and the central portion of the substrates in the range of several microns.

In order to improve such a defect as mentioned above, there is proposed a method in which a glass substrate coated with a transparent electroconductive film of $In_2O_3$ and an insulating film of SiO, $SiO_2$ or the like is dipped in a dispersion obtained by dispersing glass fibers in methanol and drawn up gradually and dried to disperse glass fibers, i.e. spacer 7a, on the whole surface of the upper substrate 1 including the orientation controlling film 5, and subsequently the thus treated upper substrate 1 and the lower substrate 2 (not shown in FIG. 5) are sealed with a conventional sealant 7 as shown in FIG. 5 (Japanese Patent Appln. Kokai (Laid-Open) No. 123950/78). But according to the above-mentioned method, since the spacer 7a is dispersed on the substrate 1 after forming the orientation controlling film 5, there often takes place damage on the orientation controlling film 5 when the sealant 7 is printed thereon, which results in causing, in the worst case, failure of orientation of the liquid crystal 8. Further since the spacer 7a is not fixed on the substrate 1 strongly, the spacer 7a is often easily removed from the substrate 1 by air blowing or during the transportation of the device, which makes the process undesirably unstable.

SUMMARY OF THE INVENTION

It is an object of this invention to improve the above-mentioned defect and to provide liquid crystal display elements having a constant distance between the two substrates even in the case of having a large panel area and a process for producing the same.

This invention provides a liquid crystal display element comprising a pair of electrode substrates facing each other at a constant distance, each electrode substrate comprising a transparent substrate and an electrode film adhered to the inside surface thereof, a pair of orientation controlling films formed on the electrodes and a sealant which may contain a spacer and seals the peripheral portions of the electrode substrates to form a space which is filled with a liquid crystal material, characterized in that one of the orientation controlling films contains a uniformly dispersed spacer therein.

This invention also provides a process for producing a liquid crystal display element comprising forming orientation controlling films on individual transparent electrodes adhered to individual inside surfaces of transparent substrates facing each other, sealing the periphery of the substrates with a sealant which may contain a spacer, and filling a liquid crystal material in the space formed between the substrates, characterized by forming an orientation controlling film containing a uniformly dispersed spacer on one of inside surfaces of the substrates having electrodes thereon.

BRIEF DESCRIPTION OF THE DRAWINGS

Other objects and advantages of the present invention may be more clearly understood by reference to the detailed description and the accompanying drawings wherein.

DETAILED DESCRIPTION

In accordance with this invention, a spacer is mixed with an orientation controlling film forming material by using a solvent in order to form an orientation controlling film containing a uniformly dispersed spacer on one of inside surfaces of the substrates having electrodes thereon.

As the spacers, there can be used fibers such as glass fibers preferably having an average length of 30–500 $\mu$m, more preferably 50–100 $\mu$m, fine inorganic particles such as alumina powder preferably having an average particle size of 6–12 $\mu$m, more preferably 10 $\mu$m, and the like.

As the orientation controlling film forming materials, there can preferably be used organic film forming materials, for example, alkoxysilanes such as $\gamma$-aminopropyltrimethoxysilane, polyvinyl alcohol, polyimides such as polyimideisoindroquinazoline, viscose rayon, unsaturated polyester resins, siloxanes such as polydimethylsiloxane, acrylic resins such as polymethyl-$\alpha$-cyanoacrylate, cellulose resins such as ethylcellulose, nitrocellulose, methylcellulose, cellulose acetate, etc., polybutadiene, polyesterimide resins, polyamides, silicone resins, polybenzoimidazole, and the like.

As the solvents, there can be used n-butyl acetate, acetone, methyl acetate, methyl ethyl ketone (particularly for viscose rayon, copolymerized polyesters such as Biron 200 manufactured by Toyobo Co., Ltd., and the like), methyl isobutyl ketone, butyl cellosolve, alcohols such as ethyl alcohol, methyl alcohol, isopropyl alcohol etc., N-methylpyrrolidone, water, and the like.

The concentration of spacer in a solution containing the orientation film forming material is preferably in the range of 0.001 to 10% by weight.

The resulting solution of orientation controlling film forming material dispersing a spacer therein is coated on the electrodes adhered to the inside surface of the transparent substrate by known processes, for example, by spray coating, dip coating, brush coating, electrostatic coating, roller coating, dust coating, rotation coating, or the like, and dried to remove the solvent. Subsequently the resulting film is baked at, e.g. 80° to 250° C. to form an orientation controlling film (12) containing a uniformly dispersed spacer (7a) therein, a cross-sectional view of the substrate coated with such an orientation controlling film being shown in FIG. 6.

Figure 1:
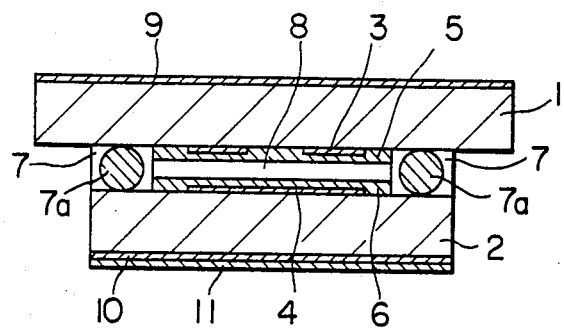
FIGS. 1 through 5 illustrate prior art arrangements of spacers used in liquid crystal display devices.
Figure 2:
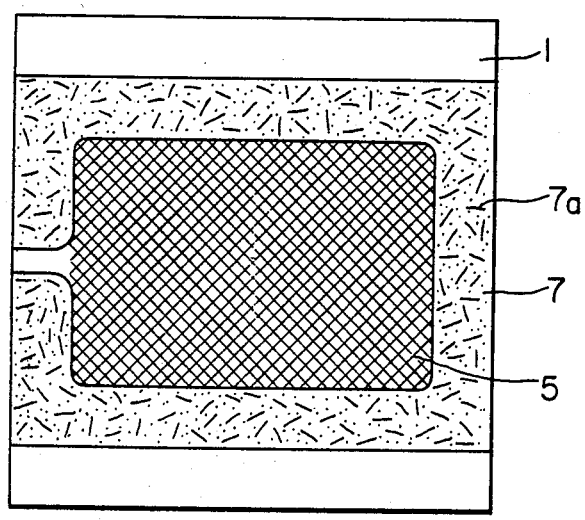
Figure 3:
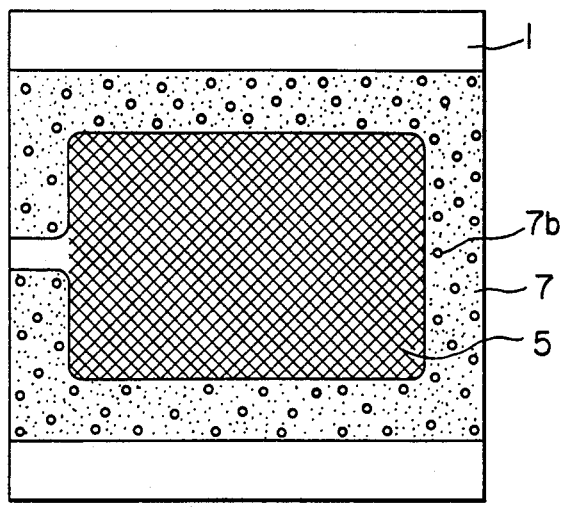
Figure 4:
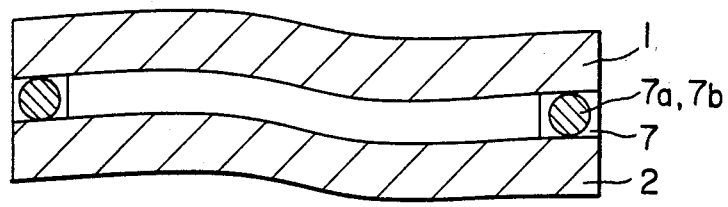
Figure 5:
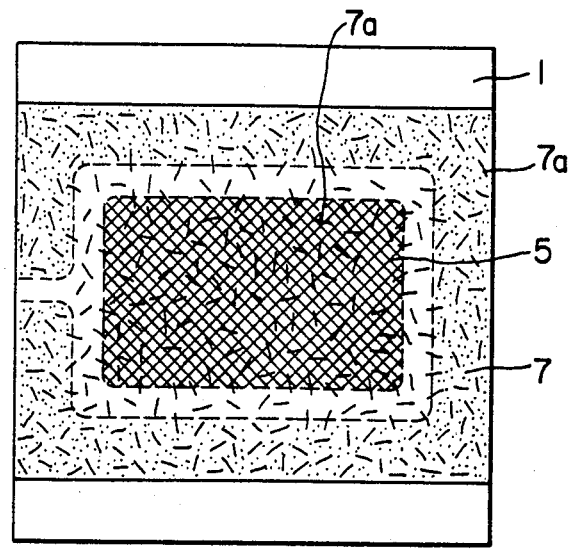
Figure 6:
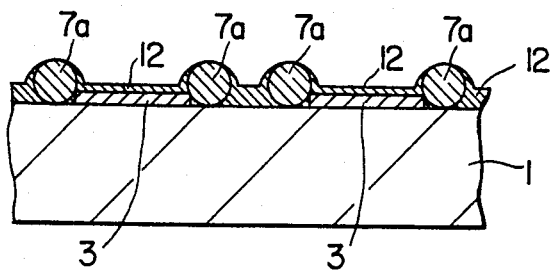
FIG. 6 is a cross-sectional view illustrating the present invention.

The thus prepared substrate as shown in FIG. 6 can be used as either the upper electrode substrate or the lower electrode substrate and liquid crystal display elements can be produced by using a conventional method.

This invention is illustrated by way of the following examples in which all percents are by weight unless otherwise specified.

EXAMPLE 1

To an ethanol solution dissolving 5% of $\gamma$-aminopropyltrimethoxysilane, 3.0% of glass fiber having an average fiber length of 50–150 $\mu$m was added to give a mixture dispersing glass fiber. The resulting mixture was dropped on the surface of electrode adhered to one of the substrates, e.g. the upper substrate 1 having the upper electrode 3 thereon, and coated uniformly on the whole surface of the upper substrate 1 by rotating the upper substrate 1 at a high speed of 100 to 3000 r.p.m. After removing ethanol by vaporization, the resulting film of $\gamma$-aminopropyltrimethoxysilane dispersing glass fiber therein and formed on the inside surface of the upper substrate 1 was baked at 150° C.–180° C. for about 30 minutes to give a cross-sectional view as shown in FIG. 6, wherein the orientation controlling film 12 contains glass fibers as a spacer 7a. Using the thus prepared upper electrode substrate, a liquid crystal display element having a panel area of 100 mm × 100 mm was prepared according to a conventional process. The deviation of distances between the two electrode substrates at the periphery portion and at the central portion was able to be controlled within ±0.5 – ±1.0 $\mu$m. The liquid crystal display element had very good time response properties and reliability.

EXAMPLE 2

Polyvinyl alcohol in an amount of 5% was dissolved in distilled water and to the resulting solution, 8.0% of granular alumina ($Al_2O_3$) having an average particle size of 10 $\mu$m was added and mixed. In the resulting mixture, the surface of upper electrode 3 formed on the upper substrate 1 was dipped for 0.5 minutes. After air-drying the dipped surface, the thus treated substrate was baked at 150° C.–180° C. for about 30 minutes to give a cross-sectional view as shown in FIG. 6, wherein the orientation controlling film 12 contains alumina granules as a spacer 7a. Using the thus prepared upper electrode substrate, a liquid crystal display element having a panel area of 100 mm × 100 mm was prepared according to a conventional process. The resulting element had the same very good properties as obtained in Example 1.

EXAMPLE 3

Polyimideisoindroquinazoline in an amount of 6.0% was dissolved in N-methylpyrrolidone and to the resulting solution, 5.0% of glass fibers having an average fiber length of 50–200 $\mu$m was added and mixed. The resulting mixture was dropped on the surface of upper electrode 3 formed on the upper substrate 1 and rotation coated and baked in the same manner as described in Example 1 to give a cross-sectional view as shown in FIG. 6, wherein the orientation controlling film 12 contains glass fibers as a spacer 7a. When a liquid crystal display element was produced by using the thus prepared upper electrode substrate, it had the same very good properties as obtained in Example 1.

EXAMPLE 4

The same N-methylpyrrolidone solution containing polyimideisoindroquinazoline and glass fibers as used in Example 3 was coated on convex portions of a letter press made of rubber and having corresponding shapes necessary for coating at a side of the blanket cylinder of an offset proof press and was transferred to the surface of upper electrode 3 formed on the upper substrate 1 by using said offset proof press. Although this method is slightly inferior in efficiency to the rotation coating used in Examples 1 and 3, it has an advantage in that only a necessary portion can be coated by using this method. The upper electrode substrate thus prepared had a cross-sectional view as shown in FIG. 6. When a liquid crystal display element was produced by using the thus prepared upper electrode substrate, it had the same very good properties as obtained in Example 1.

In the above examples, the orientation controlling film containing a uniformly dispersed spacer therein is formed on the surface of the upper electrode adhered to the upper substrate, but this invention is not limited to such a case. Needless to say, the orientation controlling film containing a uniformly dispersed spacer therein can be formed on the surface of the lower electrode adhered to the lower substrate. If necessary, the orientation controlling film containing a uniformly dispersed spacer therein can be formed both on the surfaces of the upper and lower electrodes so long as the distance between the upper and lower electrodes can be maintained constant. In most cases, the orientation controlling film containing a uniformly dispersed spacer therein is formed on the surface of electrodes adhered to one substrate and the orientation controlling film containing no spacer is formed on the surface of electrodes adhered to the other substrate oppositely placed.

Needless to say, the sealant which seals the periphery of the upper and lower electrode substrates may contain a spacer as in the usual case.

As mentioned above, according to this invention, remarkable improvement can be attained in controlling the deviation of distance between the two substrates, even in the case of larger panel display areas, within ±0.5 μm in contrast to ±2 to 3 μm of the conventional cases only by employing a very simple process of dispersing a spacer uniformly in the orientation controlling film. Therefore, liquid crystal display elements having high quality and very good properties can be produced with high productivity.

What is claimed is:

1. A liquid crystal display element comprising a pair of electrode substrates facing each other at a constant distance, each electrode substrate comprising a transparent substrate and an electrode film adhered to the inside surface thereof, a pair of orientation controlling films formed on the electrodes and a sealant which may contain a spacer and seals the peripheral portions of the electrode substrates to form a space which is filled with a liquid crystal material, characterized in that one of the orientation controlling films contains a uniformly dispersed spacer therein.

2. A liquid crystal display element according to claim 1, wherein the orientation controlling film is made from organic materials selected from the group consisting of alkoxysilanes, polyvinyl alcohol, polyimides, viscose rayon, unsaturated polyester resins, siloxanes, acrylic resins, cellulose resins, polybutadiene, polyesterimide resins, polyamides, silicone resins and polybenzoimidazole.

3. A liquid crystal display element according to claim 1, wherein the spacer dispersed in the orientation controlling film is glass fibers or alumina granules.

4. A process for producing a liquid crystal display element comprising forming orientation controlling films on individual transparent electrodes adhered to individual inside surface of transparent substrates facing each other, sealing the periphery of the substrates with a sealant which may contain a spacer, and filling a liquid crystal material in the space formed between the substrates, characterized by forming an orientation controlling film containing a uniformly dispersed spacer on one of inside surfaces of the substrates having electrodes thereon.

5. A process according to claim 4, wherein the orientation controlling film is made from a mixture containing an organic film forming material, a spacer and a solvent.

6. A process according to claim 5, wherein the organic film forming material is selected from the group consisting of alkoxysilanes, polyvinyl alcohol, polyimides, viscose rayon, unsaturated polyester resins, siloxanes, acrylic resins, cellulose resins, polybutadiene, polyesterimide resins, polyamides, silicone resins and polybenzoimidazole.

7. A process according to claim 5, wherein the spacer is glass fibers or alumina granules.

8. A process according to claim 5, wherein the solvent is methyl alcohol, ethyl alcohol, isopropyl alcohol, N-methylpyrrolidone, n-butyl acetate, acetone, methyl acetate, methyl ethyl ketone, or water.

9. A process according to claim 5, wherein the concentration of the spacer is 0.001 to 10% by weight based on the total weight of the organic film forming material and the solvent.

* * * * *